(12) United States Patent
Rychlak

(10) Patent No.: US 6,701,250 B1
(45) Date of Patent: Mar. 2, 2004

(54) METHOD OF DIRECTING A DRIVER OF A VEHICLE FROM AT LEAST ONE STARTING POINT TO AT LEAST ONE DESTINATION

(75) Inventor: Stefan Rychlak, Ilsede (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/868,709
(22) PCT Filed: Oct. 6, 1999
(86) PCT No.: PCT/DE99/03220
§ 371 (c)(1), (2), (4) Date: Sep. 21, 2001
(87) PCT Pub. No.: WO00/37890
PCT Pub. Date: Jun. 29, 2000

(30) Foreign Application Priority Data

Dec. 21, 1998 (DE) .......................................... 198 59 078

(51) Int. Cl.$^7$ ............................................. G01C 21/00
(52) U.S. Cl. ..................... 701/210; 701/209; 701/200; 340/990; 340/995
(58) Field of Search ................................ 701/210, 209, 701/200; 340/990, 995

(56) References Cited

U.S. PATENT DOCUMENTS

| 5,802,492 A | * | 9/1998 | DeLorme et al. ............ 455/456 |
| 5,878,368 A | * | 3/1999 | DeGraaf ...................... 701/209 |
| 6,163,751 A | * | 12/2000 | Van Roekel ................. 701/210 |
| 6,362,751 B1 | * | 3/2002 | Upparapalli ................. 340/995 |

FOREIGN PATENT DOCUMENTS

| EP | 0 372 840 | 6/1990 |
| EP | 0 838 797 | 4/1998 |
| WO | WO 93 09511 | 5/1993 |

* cited by examiner

Primary Examiner—Marthe Y. Marc-Coleman
(74) Attorney, Agent, or Firm—Kenyon & Kenyon

(57) ABSTRACT

A method of directing a driver of a vehicle, in particular a motor vehicle, aircraft or ship, from at least one starting point to at least one destination is described, a trip route being defined from the at least one starting point to the at least one destination. Once a certain property is specified, the driver of the vehicle is informed of which sections along the trip route have the given property. This allows the user or the driver of the vehicle to intervene specifically in the trip planning by including route sections having the given property in the route planning or by initiating the determination of an alternative route section.

16 Claims, 1 Drawing Sheet

METHOD OF DIRECTING A DRIVER OF A VEHICLE FROM AT LEAST ONE STARTING POINT TO AT LEAST ONE DESTINATION

FIELD OF THE INVENTION

The present invention relates to a method of directing a vehicle, in particular a motor vehicle, a plane or a ship, from at least one starting point to at least one destination.

BACKGROUND INFORMATION

Navigation systems installed in vehicles, such as, for example, motor vehicles, aircraft or ships may direct the driver of the vehicle rapidly, easily and reliably from a current location to a desired destination by visual or acoustic output of driving instructions without the driver of the vehicle or manner of locomotion having to plan a route before starting a trip or having to complete the remaining charting of the route on the basis of a map during the trip. For this, appropriate navigation data, based on road maps or other maps, for example, is stored in a memory in the navigation device, which may be on CD-ROM. The navigation device uses trip sensors and a compass plus optionally the signals of a GPS (global positioning system) transmitted by satellite to determine an instantaneous location of the vehicle and to calculate appropriate navigation instructions leading to a predefined destination.

With navigation devices from Blaupunkt-Werke GmbH, after the user makes appropriate entries, it is possible in calculating a route to eliminate sections of the route having a certain property. Thus, a menu item provided in an operating menu in the above-mentioned devices intended for motor vehicles allows the calculation of trip routes that do not include toll roads. With these devices, however, all toll roads used in calculating a route may be allowed or excluded.

SUMMARY OF THE INVENTION

The exemplary device according to the present invention is believed to have the advantage that individual route sections having a given property can be selected or deselected by the user on an individual basis. This may yield the further advantage that the user can determine an optimal route, such as, for example, in the sense of making an evaluation between the lowest possible trip cost, which might suggest avoiding toll roads as much as possible, and a minimized travel time, which would in turn make the use of toll roads seem appropriate.

It is believed to be especially advantageous here if route sections, such as, for example, toll roads, having a given property defined as part of the route calculation are output together with an available detour. This allows the user to make a direct comparison of the route section having the given property with the alternative route section, thus facilitating a decision for one of the two routes suggested.

Furthermore, it is believed to be advantageous if additional information characterizing the route section with the given property or the alternative route section is also output in addition to the route section having the given property and the alternative route section. This should make it easier for the user to make a decision about selection or deselection of a route section having the given property on the basis of a comparison between the toll road route section and the detour route, for example.

It is likewise believed to be advantageous if traffic congestion or other traffic obstacles such as construction sites or roadblocks can be preselected as a property characterizing a route section, so that the user can, if desired, detour route sections characterized in this way.

DETAILED DESCRIPTION

Figure 1:
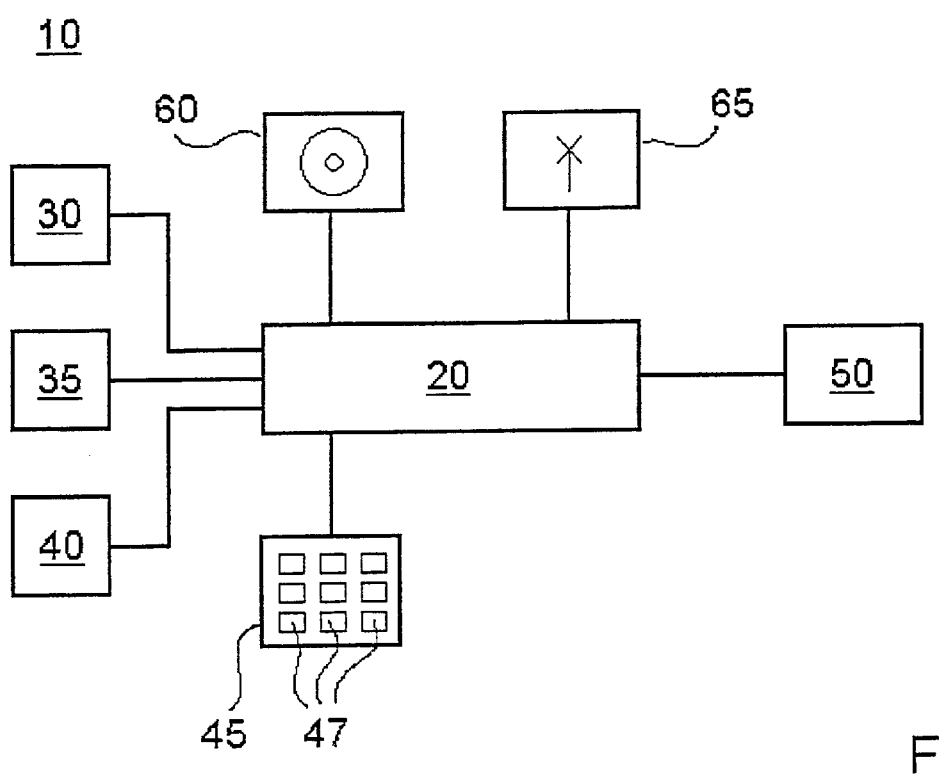
FIG. 1 shows a block diagram of an exemplary navigation device according to the present invention for carrying out or performing the exemplary method according to the present invention.

FIG. 1 shows a block diagram of an exemplary navigation device according to the present invention for carrying out or performing the exemplary method according to the present invention. The apparatuses, arrangements or structures 30, 35, 40, which provide information regarding the location, the direction of movement and the movement status of the vehicle, are connected to device control 20 of navigation device 10, which also includes the actual navigation computer.

In the exemplary embodiment, these apparatuses, arrangements or structures include a rotational rate sensor 30 with the help of which the orientation of the vehicle in which the navigation device is installed is defined with respect to the cardinal directions by integration via the detected changes in rotational rate. In addition, they include a trip odometer 35 which detects pulses delivered by wheel sensors in an anti-skid system for the vehicle brakes, for example, and determines the distance traveled on the basis of the defined pulse count and a known wheel circumference. Finally, they include a GPS (global positioning system) receiver 40 for receiving and analyzing radio signals which are emitted by GPS satellites and can be used to determine the position of the vehicle.

In addition, a memory 60 for storing map information in digital form is connected to control 20. In the exemplary embodiment, memory 60 is in the form of a CD-ROM drive into which is inserted a CD-ROM as the data medium for the map information. Likewise, however, memory 60 may also be implemented in the form of a RAM or ROM semiconductor memory.

In addition, an output unit 50, which is a display device in the present case, is also connected to control 20. During the actual navigation operation, driving instructions for the driver of the vehicle are displayed there, such as, for example, in the form of a directional arrow in the case of pending turns and a remaining distance display up to the turn. As an alternative or in addition to the visual display, it is also possible for output device 50 to include an acoustic output device for output of acoustic driving instructions, such as "turn right after 100 meters" or the like.

Finally, an input unit 45 having operating elements such as pushbuttons 47 or some other input apparatus, arrangement or structure, such as rotary knobs, is connected to control 20 for input of a navigation destination and for operation of other functions of the device.

The exemplary navigation device according to the present invention and the exemplary navigation method according to the present invention function as follows.

After switching on navigation device 10, sensors 30, 35, 40, namely rotational rate sensor 30, trip odometer 35 and GPS receiver 40 supply information from which control 20, that is, the navigation computer contained in the control, determines the current position of the vehicle in which the navigation device according to the present invention is installed. The control optionally also takes into account data from the map stored in memory 60 in the context of a plausibility check for correction of the vehicle's position calculated on the basis of the sensor data. This type of correction of the vehicle's defined position is also known by the term "map matching."

After or even during the determination of the current location of the vehicle, a navigation destination is input as described below, for example.

First, for interregional trips, the name of the city or town is entered as the destination on input unit 45 by scrolling through the alphabet, such as, for example, by using a rocker key 47 or a rotary knob, the first letter of the name of the city is selected and then confirmed. Then a selection list of names of cities and towns beginning with the letter entered appears on display unit 50 of the navigation device. For further selection of the name of the town, the available list of town names may be scrolled through by using rocker keys until discovering the desired town name. As an alternative, however, it is also possible to enter the town name by entering the second letter and optionally other letters by the exemplary method described above.

Then by a similar method in a second step, the street name of the desired destination is entered. If the city selected as a destination is a small city or town, it is also possible for a list of street names to be output over the output device immediately after input of the name of the city or town, so the user can then select the correct street name.

In the case of very long streets where the name remains the same, there may also be a third step in which a house number, an intersection with another street or another landmark along the street is also entered by the user to define the navigation destination more precisely.

As an alternative to the form of destination input described here, the navigation destination may be entered by a number assigned to the destination address, such as, for example, a telephone number. Therefore, the navigation device has a memory in which a list of telephone numbers is stored together with a respective address list, thus permitting an unambiguous correlation of a telephone number with a destination address.

In addition, navigation device 10 may also have a chip card reader, and the navigation destination may be read from a chip card inserted into the chip card reader. To do so, first the navigation destination is written into a rewritable memory of the chip card by using a suitable device such as a personal computer having a chip card reader.

A destination may also be input by marking and selecting the destination on a map shown on a display unit by using cursor keys, for example, and then on the basis of the information stored in memory 60 of navigation device 10, assigning destination coordinates to the destination thus marked.

In the exemplary methods for inputting a destination described so far, it has been assumed that only a single destination is input. According to another exemplary embodiment of the present invention, however, multiple destinations may be entered so the navigation computer calculates an optimal route from the standpoint of minimal driving time or distance. For example, this may be appropriate for delivery vehicles, for example, of a package delivery service that must drive to multiple delivery addresses within a single delivery trip.

After determining the starting point and destination (if the navigation device does not have any self-locating system, the starting location must also be entered in the manner described here), according to the exemplary embodiment and/or exemplary method of the present invention the user (the driver of the vehicle in the present case of a navigation device for a motor vehicle) can enter a preselectable property for a route section potentially to be avoided, such as, for example, a route section with a road use fee. A certain property of a route section can be entered, for example, by scrolling through a list of properties by using rocker key 47.

This is based on whether the driver of the vehicle might want to exclude certain route sections having a specific property, such as toll roads, from planning of the route.

If, however, the user has detailed knowledge of the traffic volume on certain route sections, such as, for example, because of updated traffic information broadcast by radio, it may be appropriate to allow the driver of the vehicle to intervene in the planning of the route by not automatically excluding route sections having the given property from planning of the route and instead allowing the user to decide whether or not to include a certain route section.

According to the exemplary embodiment and/or exemplary method of the present invention, in the course of route planning, the driver of the vehicle is informed of such route sections having a previously selected property, such as, for example, toll roads, such as, for example, in the form of a display on display unit 50. The driver of the vehicle may then accept the route section output, so that it is included in planning the route, or may reject it as undesirable, whereupon an alternative route section is defined in planning the route.

Since, however, bypassing toll road sections, for example, may entail a considerable detour or a much longer trip time, in an exemplary embodiment, the driver of the vehicle may exclude the toll road, for example, from planning the route when a route section having the given property occurs, or include it if bypassing it would lead to an unacceptably long travel time or would entail other disadvantages.

In addition to the route section having the given property, an alternative route section is also defined, and both the route section having the given property as well as the alternative section are output, such as, for example, on a display unit. Furthermore, additional information characterizing the alternative route section in addition to at least the alternative route section or the section having the given property is output. The features characterizing the alternative route section may include, for example, additional driving time required, an additional driving distance or the road toll saved.

In another exemplary embodiment of the-present invention, features characterizing the route section having the given property, such as a road use fee, roadblocks, construction sites or traffic jams are also output in addition to the properties characterizing the alternative route section.

To obtain current information, such as, for example, regarding traffic jams, construction sites or roadblocks not included in map memory 60, navigation device 10 according to an exemplary embodiment of the present invention has a receiver, which may be in the form of a radio receiver 65 connected to control 20.

According to a first exemplary embodiment, the radio receiver may be a TMC radio receiver suitable for analysis of digitally coded traffic information according to the TMC (traffic message channel) standard transmitted over a radio broadcast frequency as part of the radio data signal in a known way. The received traffic information is linked to map data from memory 60 according to the exemplary embodiment and/or exemplary method of the present invention so that the respective current traffic information, such as traffic jams, roadblocks and construction sites is allocated as characteristic properties to specific route sections.

In another exemplary embodiment, the radio receiver may be a mobile cellular telephone, so that after dialing a service provider and establishing the connection, for example, the service provider provides current or updated information about route sections affected. This information is then linked to the map data for characterization of the route sections affected.

What is claimed is:

1. A method of directing a driver of at least one of a vehicle, a motor vehicle, an aircraft, a boat and a ship, from at least one starting point to at least one destination, the method comprising:

defining a trip route from the at least one starting point to the at least one destination;

specifying a certain property; and offering the driver of the vehicle, once the certain property is specified, one of selecting and rejecting individually at least one route section along a trip route having the certain property.

2. The method of claim 1, further comprising: defining an alternative route section once the at least one route section having the certain property is output and is rejected by the driver of the vehicle.

3. The method of claim 1, further comprising: defining and outputting an alternative route section when the at least one route section having the certain property is defined.

4. The method of claim 3, further comprising: outputting the alternative route section, in addition to outputting the at least one route section defined having the certain property.

5. The method of claim 3, further comprising: outputting additional information characterizing one of the alternative route section and the route section having the certain property, in addition to outputting at least one of the alternative route section and the route section having the certain property.

6. The method of claim 5, wherein the additional information includes at least one of an additional travel time, an additional driving distance and a saved road use fee.

7. The method of claim 1, wherein the certain property characterizing the at least one route section includes at least one of a road use fee, traffic jam information, roadblock information and construction site information.

8. The method of claim 1, wherein a route section is a portion of a route which is shorter than the entire route.

9. An apparatus for directing a driver of at least one of a vehicle, a motor vehicle, an aircraft, a boat and a ship, from at least one starting point to at least one destination, the apparatus comprising:

a defining arrangement for defining a trip route from the at least one starting point to the at least one destination;

a specifying arrangement for specifying a certain property; and an offering arrangement for offering the driver of the vehicle, once the certain property is specified, one of selecting and rejecting individually at least one route section along a trip route having the certain property.

10. The apparatus of claim 9, further comprising: another defining arrangement for defining an alternative route section once the at least one route section having the certain property is output and is rejected by the driver of the vehicle.

11. The apparatus of claim 9, further comprising: a defining and outputting arrangement for defining and outputting an alternative route section when the at least one route section having the certain property is defined.

12. The apparatus of claim 11, further comprising: an outputting arrangement for outputting the alternative route section, in addition to outputting the at least one route section defined having the certain property.

13. The apparatus of claim 11, further comprising: an outputting arrangement for outputting additional, information characterizing one of the alternative route section and the route section having the certain property, in addition to outputting at least one of the alternative route section and the route section having the certain property.

14. The apparatus of claim 13, wherein the additional information includes at least one of an additional travel time, an additional driving distance and a saved road use fee.

15. The apparatus of claim 9, wherein the certain property characterizing the at least one route section includes at least one of a road use fee, traffic jam information, roadblock information and construction site information.

16. An apparatus for directing a driver of at least one of a vehicle, a motor vehicle, an aircraft, a boat and a ship, from at least one starting point to at least one destination, the apparatus comprising:

means for defining a trip route from the at least one starting point to the at least one destination;

means for specifying a certain property; and means for offering the driver of the vehicle, once the certain property is specified, one of selecting and rejecting individually at least one route section along a trip route having the certain property.

* * * * *